E. B. HARDING.
SPECULUM.

No. 187,625. Patented Feb. 20, 1877.

Witnesses:
F. B. Townsend.

Inventor:
Evans B. Harding

Attorneys.

UNITED STATES PATENT OFFICE.

EVANS B. HARDING, OF NORTHAMPTON, MASSACHUSETTS.

IMPROVEMENT IN SPECULUMS.

Specification forming part of Letters Patent No. 187,625, dated February 20, 1877; application filed December 6, 1876.

*To all whom it may concern:*

Be it known that I, EVANS B. HARDING, of Northampton, in the county of Hampshire, and State of Massachusetts, have invented certain new and useful Improvements in Speculums; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
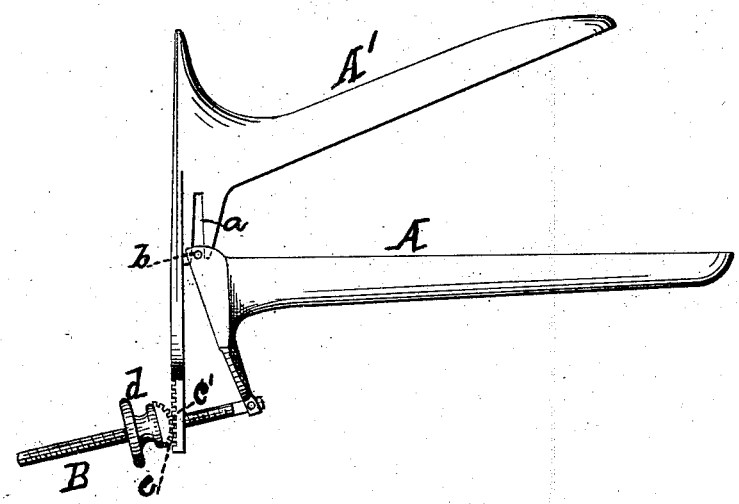
Figure 2:
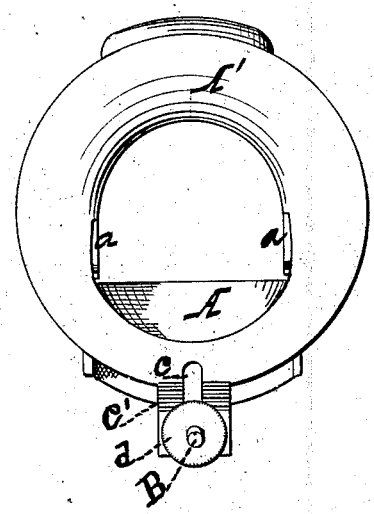
Figure 3:

Figure 1 is a side elevation of my improved speculum. Fig. 2 is a rear view thereof, and Fig. 3 is a serrated or toothed nut, which is interposed between the thumb-nut and upper blade.

Corresponding parts in the several figures are denoted by like letters.

This invention relates to a certain improvement in that class of speculums which permit of the expansion of the rear ends of their blade; and it consists of mechanism for adjusting the thumb-nut in regulating the angle of expansion of the blades, in retaining the adjusting-screw or lever centrally in its slot in the upper blade, &c., substantially as hereinafter more fully set forth and claimed.

In the annexed drawing, A refers to the lower, and A' to the upper, blade of the speculum. The flaring, ringed portion of the upper blade A' is provided upon its front portion with vertical slots $a\ a$ to receive, and within which slide, studs or projections $b\ b$ upon the lower blade A. By thus hinging the parts together, the outer or rear ends of the blades can also be expanded, permitting of greater expansion of their forward ends to obtain the greatest amount of distention of the vagina throughout, from the entrance of the orifice inwardly.

The above result, it will be seen, follows, from the fact that the slots in the upper blade allow the lower blade to be adjusted, so as to remove its outer end from that of the upper blade, the joint or connection thus produced acting as an inclined plane, up which the adjusting-screw or lever, to be hereinafter described, carries the upper blade.

The expansion of the outer or rear ends of the blades will not interfere with their angle of expansion. Pivoted to the lower blade A, and passing through an elongated slot, $c$, in an extension, $c'$, of the upper blade A', is a threaded lever or screw, B, for adjusting and expanding the blades in introducing the speculum.

When the speculum is in a partially expanded position, the lever may be manipulated so as to further temporarily expand the parts being distended, and alter the relative angles of the blades.

Upon the lever or screw B is a thumb-nut, $d$, for working the same; and between the nut $d$ and the extension $c'$ (provided with a series of teeth or serrations, as seen in Fig. 2) is interposed a second nut, $e$, in cross-section the arc of a circle, and also serrated or toothed upon its convex surface, as seen in Figs. 1 and 3.

It will be observed that the teeth of the nut $e$ engage the rack or toothed extension $c'$, by which the screw or lever B is held centrally in the slot $c$ of the said extension, obviating the screw catching against the said extension, &c., and a stay is furnished for holding the adjusting-screw at any desired point in regulating the angle of expansion, the teeth of the nut and rack interlocking with each other, and thus attaining the result above named.

Having thus described my invention, what I claim and desire to secure by Letters Patent, is—

1. The upper blade A' of a speculum, having the slots $a\ a$, in combination with the lower blade A, having the studs $b\ b$, by which their outer or rear ends are expanded, permitting of greater expansion of their inner or free ends to obtain the greatest amount of distention, substantially as set forth.

2. The upper blade A', having the slots $a\ a$, and slotted extension $c'$, in combination with the lower blade A, having the studs or projections $b\ b$, screw or lever B, and thumb-nut $d$, substantially as and for the purpose set forth.

3. The upper blade of a speculum, having the slotted, rack $c'$ in combination with the lower blade and screw or lever B, having the serrated or toothed nut $e$, and thumb-nut, substantially as and for the purpose set forth.

In testimony that I claim the foregoing as my own, I hereunto affix my signature in presence of two witnesses.

EVANS B. HARDING.

Witnesses:
CHAUNCEY H. PIERCE,
SAM. W. LEE, Jr.